UNITED STATES PATENT OFFICE.

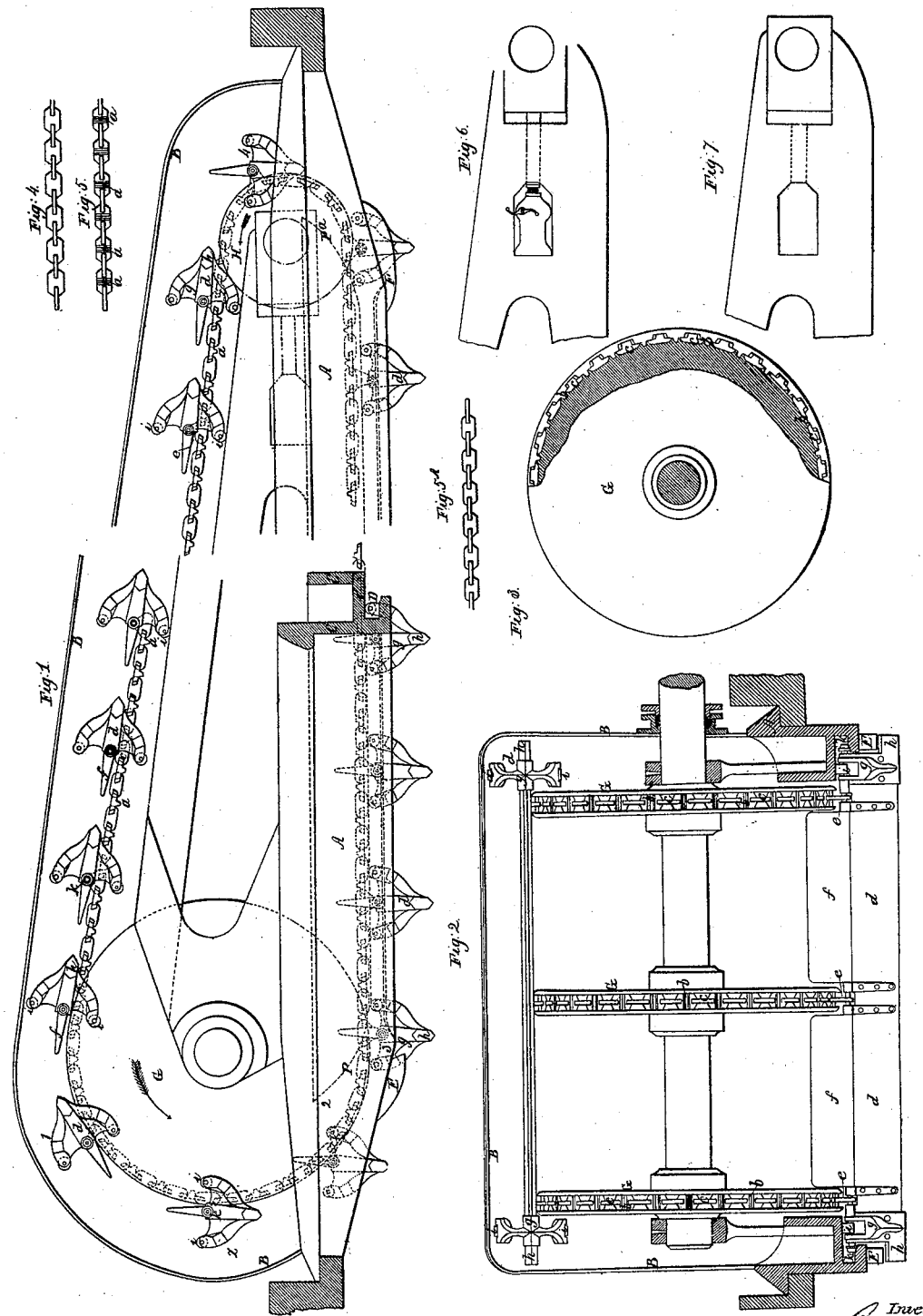

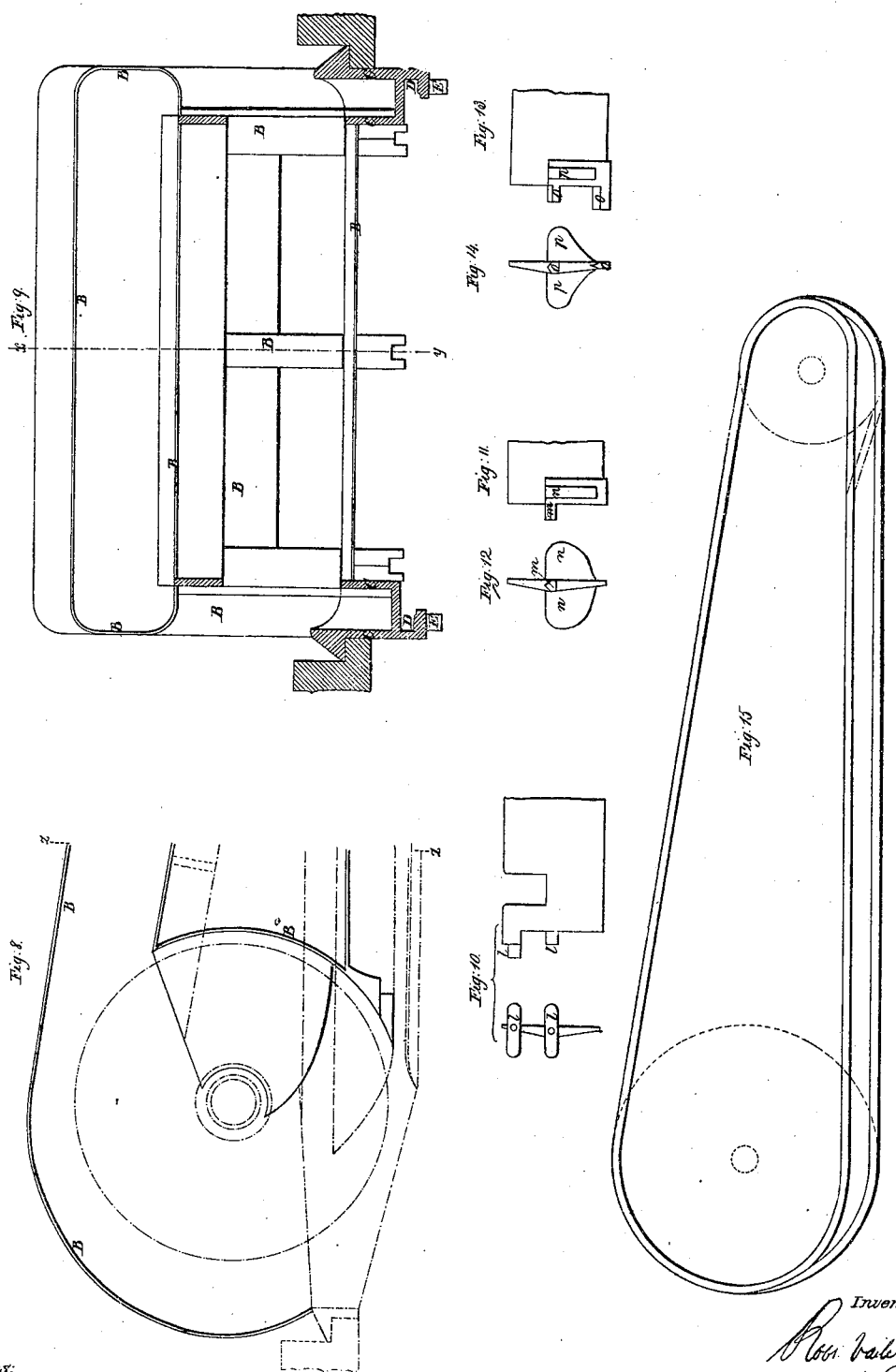

ROBERT VAILE, OF CROMWELL TERRACE, WESTBOURNE GREEN, COUNTY OF MIDDLESEX, ENGLAND.

IMPROVED SUBMERGED PROPELLER.

Specification forming part of Letters Patent No. 39,083, dated June 30, 1863.

*To all whom it may concern:*

Be it known that I, ROBERT VAILE, of Cromwell Terrace, Westbourne Green, in the county of Middlesex, England, gentleman, have invented Improvements in Propellers for Ships and Boats; and I do hereby declare that the following is a full and exact description thereof, reference being had to the accompanying drawings, and to the figures and letters marked thereon.

My invention relates to endless-chain propellers; and it consists in means, hereinafter described, for maintaining the floats attached to the chains in proper positions and for driving the chains. The chains are passed round two or more drums or rollers. The drums are furnished with projecting rims or collars, having indentations to receive the chains. The drums may be placed either in a horizontal, vertical, or angular position. The floats are cut so as receive the drum-collars and attached to the chains a little above, below, or in the center. The floats work in grooved guides and are furnished with projecting arms and friction-rollers. They are feathered and are kept from getting into a wrong position by the action of the water and by their arms coming in contact with guides. The upper part of the propeller works in a case, and provision is made for hoisting the whole apparatus on deck in case of need.

Figure 1 of the accompanying drawings is a side view of my improved propeller. Fig. 2 is a transverse section. For clearness' sake drums are not shown in the drawings, but simply a central shaft, with collars G G G. Fig. 3 is a side view of one of the collars, G, with parts removed, showing the indentations into which the chains take. Fig. 4 is a top plan, Fig. 5 a bottom plan, of one the of chains; and Fig. 5$^a$ is a side view of a chain with differently-shaped links.

Each alternate link of the chains has a tooth, $a$, on its under side, which takes into indentations $b$, formed in the collar, Fig. 3, while the alternate links are received in longitudinal slots $c$. The floats $d\,d$, Figs. 1 and 2, are linked to the chains by means of lugs made in a piece with links $e\,e$, forming part of the chain, and made with an eye for receiving a spindle secured to the float by straps or other suitable means. At Fig. 2 three collars and chains are shown; consequently each float is connected to the chains by three separate spindles. The upper parts of the floats $f\,f$ have portions cut away to allow of their working between the collars, as shown at Fig. 2. Each float $d$ is furnished with projecting arms, carrying-rollers $i\,i$, and central flanged rollers, $k$. The projections $h$, acting on the guides E or F, prevent the floats entering the water in a wrong position.

A is the lower frame of the propeller, which is to be fixed in some part of a vessel so that the floats may work below the water-line.

B is a casing secured to the frame A, and inclosing the whole apparatus. I prefer to fix two propellers, one on each side of the keel and at about the center of the ship. The frame A is formed with double sides C C, and with a groove, D, with surfaces for the rollers $i\,i$ and $k$ to travel on.

E E and P P are guides, one of each of which only is seen in the drawings, fixed near the fore part of the frame A and F F, and P$^a$ P$^a$ are other guides fixed near the rear end of the said frame. The frame A carries bearings for the support of the shafts of two sets of collars, G and H. The collars H are by preference of less diameter, but are otherwise similar to those first mentioned. The chains are carried round the collars G and H in the direction of the arrows, and for the purpose of keeping the chains tight the bearings for the shaft of the collars H are free to slide in slots. They may be acted upon by a jack, as shown at Fig. 6, and upon having been driven forward by it, the space between the bearings and the solid part of the frame should be filled with a packing, as shown at Fig 7, when the jack may be removed. Upon rotary motion being communicated to the shaft of the collars G, the floats are caused to move and assume the positions shown at Fig. 1. When traveling along the upper part of the frame, the floats lie parallel with the chains, the flanged rollers $k$ resting upon rails formed to receive them, but not shown in the drawings. As soon as each float reaches the point marked 1, it commences to alter its position, and when it reaches the point marked 2, whether it descends in the reversed position shown at $z$, Fig. 1, or not, then, in consequence of its arms coming into contact with the curved ends of the guides, (marked P or E,) it assumes the position 3, and is made to retain that position by the rollers *i i* coming in contact with the bottom of the upper surface of the groove D, and the central flanged roller, K, coming in contact with the flanged surface thereof. In this position the floats are maintained until they are feathered to leave the water. This feathering is effected by the pressure of the water and the contact of the appliances attached to the floats with the guides P<sup>a</sup> P<sup>a</sup>, as the rollers leave the groove D. The floats then assume the position 4, and afterward lie parallel with the chains.

Fig. 8 is a section through the line *x y* of Fig. 9, which is a section through the line *z z* of Fig. 8 of the casing and frame in which the collars G work. The collars H work in a similar casing. In some cases, instead of forming arms and rollers, as hereinbefore described, I fix on the floats arms *l l*, as shown in front and end elevations at Figs. 9 and 10, and in this case I use a grooved guide, as shown in side view at Fig. 15.

Figs. 11 12 and 13 14 are side and end views of two forms of arms with projections *m n o p*. In all the forms of arms or projections shown or described, friction rollers may be used, or a surface of friction-rollers may be placed in the guides for plain arms to travel upon. In order to go astern, it is simply necessary to reverse the engine, thus changing the direction of rotation of the collars G and chains, when the same positions will be assumed by the floats passing over the collars H, and in their course from those collars to the collars G as were assumed by them when propelling "ahead," as hereinbefore described.

Although shown in the drawings, I do not confine myself to guides placed at the ends of the floats, for they may be placed as and where most convenient, and in such numbers as may be desired. In like manner any number of chains may be used.

The floats may be made of wood or iron, or both combined, and, if found desirable, the propelling-surface may be made concave.

To provide for the hoisting of the propeller, I build a water-tight compartment completely round it, leaving sufficient room for a man to walk round, and unfasten the bolts securing the propeller to the ship, and carried up above the water-line and fitted with guides to keep the propeller in proper position while hoisting. The driving-shaft is then disconnected inside the water-tight compartment, and the hole through which it passed closed. The propeller is then hoisted by means of screws or hoisting-tackle, a cover fitting the opening in the ship is then lowered into its place, and the water in the compartment allowed to run to the bilge, where it is clared by the bilge-pumps. The compartment may be made movable or fixed. If preferred, the water-tight compartment may be covered in at a height sufficient to allow the propeller to be hoisted clear of the ship's bottom by means of screws attached to the frame of the propeller, and passing through the top of the water-tight compartment, the water is then cut off by means of slides level with the bottom of the ship, working in water-tight cases. The water is then allowed to run out, and is cleared, as before described. In some cases the frame of the propeller is made to fit the compartment like a piston. The compartment is left uncovered at the top, and is only carried up a sufficient height to allow the before-mentioned slides to work clear of the propeller.

I am aware that endless-chain propellers have been heretofore proposed, and I therefore make no claim thereto; but

I claim—

1. Driving endless-chain propellers by means of drums with a collar or collers on shafts, and chains to which floats are attached, the collars and chains being constructed and the attachment effected in the manner hereinbefore described.

2. Connnecting the floats to the endless chains by means of spindles working in l'nes formed in a piece with links in the endless chains, as hereinbefore described.

3. The means of causing the floats to assume and retain their respective positions for entering the water, for producing their greatest propelling effect in the water, for feathering on leaving the water, and for returning to again enter the water, consisting of guides and grooves, and of appliances on the floats, all acting substantially in the manner hereinbefore described.

ROBT. VAILE.

Witnesses:
 R. A. WOOMAN,
  *Patent Agent*, 166
   *Fleet Street, London*,
 J. C. NEWBURN,
  166 *Fleet Street, London*.